United States Patent [19]

Taguchi

[11] Patent Number: 5,433,006
[45] Date of Patent: Jul. 18, 1995

[54] MOWING APPARATUS

[75] Inventor: Hiroshi Taguchi, Higashiyamato, Japan

[73] Assignee: Komatsu Zenoah Company, Tokyo, Japan

[21] Appl. No.: 188,438

[22] Filed: Jan. 28, 1994

[51] Int. Cl.⁶ ............................................. A01D 50/00
[52] U.S. Cl. ........................................ 30/276; 56/12.7; 56/295
[58] Field of Search ................... 30/276, 347; 56/12.7, 56/295

[56] References Cited

U.S. PATENT DOCUMENTS

| | | | |
|---|---|---|---|
| 3,708,967 | 1/1973 | Geist et al. | 56/12.7 |
| 4,035,915 | 7/1977 | Pittinger, Jr. | 30/347 |
| 4,054,992 | 10/1977 | Ballas et al. | 30/276 |
| 4,062,114 | 12/1977 | Luick | 30/276 |
| 4,062,115 | 12/1977 | Lee | 30/276 |
| 4,068,376 | 1/1078 | Briar | 30/276 |
| 4,086,700 | 5/1978 | Inada | 30/276 |
| 4,107,841 | 8/1978 | Rebhun | 30/276 |
| 4,118,865 | 10/1978 | Jacyno et al. | 30/276 |
| 4,190,954 | 3/1980 | Walto | 30/347 |
| 4,475,287 | 10/1984 | Beihoffer | 30/276 |
| 4,550,498 | 11/1985 | Oliver | 30/276 |
| 4,571,831 | 2/1986 | White, III | 30/276 |
| 4,685,279 | 8/1987 | Gullett | 56/12.7 |
| 4,756,146 | 7/1988 | Rouse | 56/12.7 |
| 4,819,416 | 4/1989 | Jones | 56/12.7 |
| 4,856,194 | 8/1989 | Lee | 30/276 |
| 4,905,465 | 3/1990 | Jones et al. | 56/295 |
| 5,023,998 | 6/1991 | Masciarella et al. | 30/276 |
| 5,048,278 | 9/1991 | Jones et al. | 56/295 |

*Primary Examiner*—Hwei Siu Payer
*Attorney, Agent, or Firm*—Weiser & Associates

[57] ABSTRACT

A mowing apparatus including: a motive power source; a circular rotational member which is adapted for rotation by the motive power source; at least one flexible cutting line having opposite ends and being adapted to setting on the rotational member in such a manner that the opposite ends of the cutting line freely extends from the rotational member to the outside and rotates with the rotational member, thereby mowing with the ends of the cutting line; and a retention member provided on the rotational member for removably retaining the cutting line on the rotational member, and having at least a pair of first and second faces each of which stands on the rotational member and faces to each other with a space therebetween in which the cutting line is to be received for retention so that the cutting line passes between the first and second faces. For restraining the cutting line from being released from the space, the first and second faces are inclined to each other so that the space between the first and second faces is narrowed according to the farness from the rotational member. Alternatively, the a bend face extends from the first face over the space between the first and second faces.

20 Claims, 4 Drawing Sheets

MOWING APPARATUS

BACKGROUND OF THE INVENTION

1. Field of the Invention

The present invention relates to a mowing apparatus with a mowing head including a rotational member and flexible cutting lines which are fitted to the rotational member and rotate with the rotational member around the mowing head, thereby grass and the like are cut by the rotating cutting lines.

2. Description of the Prior Art

There are two general classification types for conventional mowing apparatus which can be identified in accordance with their cutting devices. In one of those types, a disk-shaped cutter which is formed with a large number of cutting teeth on the outer periphery thereof is mounted on a mowing head as a cutting device and it is rotated in order to cut grass with the cutting teeth. In the other type, a few lines made of strong and flexible material such as nylon and the like are provided on a mowing head, and these lines are rotated at a high speed around the mowing head to cut grass with the free ends of the lines. In comparing these two types, it can be easily understood that the line-cutting type is more advantageous in operational safety than the disk-cutting type.

U.S. Pat. No. 3,708,967 of Geist et al. issued on Jan. 9, 1973 discloses an example of the line-cutting type mowing apparatus. This mowing apparatus comprises a mowing head having a rotational member with reel members. For every reel member, a long cutting line is wound thereupon, and the free end of the cutting line extending from the reel is rotated around the mowing head by the rotational member which is rotated relative to the mowing head by a drive source. If the cutting line is worn out, an appropriate length of the cutting line is pulled out from the reel member in order to use a fresh portion of the cutting line.

However, In recent years strength and durability of the line cutter have been remarkably improved in accordance with development of material technology. Therefore, wear of the cutting line caused by use is reduced so that it is no longer required to frequently supply a fresh cutting line. Moreover, for promoting easy operation, a light and small mowing head is preferred. As a result, a modification to the line-cutting type mowing apparatus has been employed lately; in which the reel is omitted and each of the cutting lines, with an appropriate length, are directly secured to the rotational member. In this modification, if the line cutter is worn out, it is removed and changed with a fresh one.

A mowing apparatus with the above-described structure is disclosed, for example, in FIGS. 1 to 4 of U.S. Pat. No. 4,190,954 of Mar. 4, 1980 by Walto. This mowing apparatus comprises two lines and the intermediate portions of the lines are tied to each other at the center of a disk type rotational member on the lower surface thereof so that the terminal ends of the lines can radially extend from the rotational member at equal angular intervals between each line.

Moreover, FIGS. 5 and 6 of U.S. Pat. No. 4,190,954 also disclose another example. In this example, the central portions of the lines are not tied together but retained in curved recesses on the rotational member.

In connection with the mowing apparatus of the above-described mode, there are some highly important issues. First, the cutting lines must be easily set to the rotational member and they must also be firmly retained on the rotational member after the setting so that the cutting lines can be prevented from moving and coming off the rotational member. Second, since the free ends of cutting lines, during cutting operation, are always pulled outwards by centrifugal force and resistant or frictional forces caused by the grass being cut and the like, it is necessary to prevent such stress from being concentrated on a specific portion of the cutting line (e.g. the portion of the cutting line which the line is restrained to the rotational member) to prohibit failure due to the concentrated stress, before the free ends of the line get worn down.

Concentrating on the above-described issues, it can be seen that the first example of U.S. Pat. No. 4,190,954 is prone to fall with respect to the second issue. Specifically, the lines may be easily cut off at the tied portions, because two cutting lines are pulling against each other, thereby the tensile force will be localized in the entangled portions. Moreover, since the lines of this example pass through the center of the rotational member, it is impossible to modify the arrangement, such as to attach the lines to the upper side of the rotational member. As a result, the mowing head of the apparatus must be turned upside down for replacement of the cutting lines.

On the contrary, the second example of U.S. Pat. No. 4,190,954 can solve the problems contained in the second issue. However, It is disadvantaged in solving the problems of the first Issue described above, because the cutting lines may easily move or come off the rotational member. Especially, when a somewhat hard or thick cord is used and set to the rotational member as a cutting line, the cord will likely move due to the force acting within the bent portions of the cord to return it to its natural straight state.

As described above, the conventional line-cutting type mowing apparatus cannot meet the following criteria fully, easy replacement and firm restraining of the cutting lines and prevention of local concentration of stress in the cutting lines.

SUMMARY OF THE INVENTION

Therefore, it is an object of the present invention to provide an improved line-cutting type mowing apparatus in which the cutting lines can be easily replaced and firmly retained on the rotational member.

Another object of the present invention is to provide an improved line-cutting type mowing apparatus in which the cutting lines can be firmly retained on the rotational member without local concentration of stress on the cutting lines.

In order to achieve the above-mentioned objects, a mowing apparatus according to the present invention comprises: a motive power source for supplying rotational motion; a circular rotational member which is adapted for rotation by the rotational motion supplied by the motive power source; at least one flexible cutting line having opposite ends, the cutting line being adapted to setting on the rotational member in such a manner that the opposite ends of the cutting line freely extends from the rotational member to the outside and rotates with the rotational member, thereby mowing with the ends of the cutting line; retention means provided on the rotational member for removably retaining the cutting line on the rotational member, the retention means comprising at least a pair of a first face and a second face each of which stands on the rotational member and faces to each other with a space therebetween in which the cutting line is to be received for retention so that the cutting line passes between the first and second faces; and restraining means for restraining the cutting line from being released from the space between the first and second faces.

The restraining means comprises inclination provided on each of the first and second faces so that each of the first and second faces is inclined to each other and the space between the first and second faces is narrowed according to the farness from the rotational member. Alternatively, the first face standing higher than the second face, and the retaining means comprises a bend face extending from the first face over the space between the first and second faces.

Moreover, according to the present invention provided is a mowing apparatus comprising: a motive power source for supplying rotational motion; a circular rotational member which is adapted for rotation by the rotational motion supplied by the motive power source; at least one flexible cutting line having opposite ends, the cutting line being adapted to setting on the rotational member in such a manner that the opposite ends of the cutting line freely extends from the rotational member to the outside and rotates with the rotational member, thereby mowing with the ends of the cutting line; retention means provided on the rotational member for removably retaining the cutting line on the rotational member, the retention means comprising at least a couple of a nail and a hook facing to each other, the nail being provided at a circumferential position of the rotational member, the hook standing higher than the nail and locating on a radially inward position on the rotational member, and the cutting line being to be received for retention so that the cutting line passes between the hook and the nail.

BRIEF DESCRIPTION OF THE DRAWINGS

The features and advantages of the mowing apparatus according to the present invention over the proposed mowing apparatus will be more clearly understood from the following description of the preferred embodiments of the present invention taken in conjunction with the accompanying drawings in which like reference numerals designate the same or similar elements or sections throughout the figures thereof and in which.

DETAILED DESCRIPTION OF THE PREFERRED EMBODIMENTS

Referring now to the drawings, a preferred embodiment of the mowing apparatus according to the present invention will be described.

Figure 1:
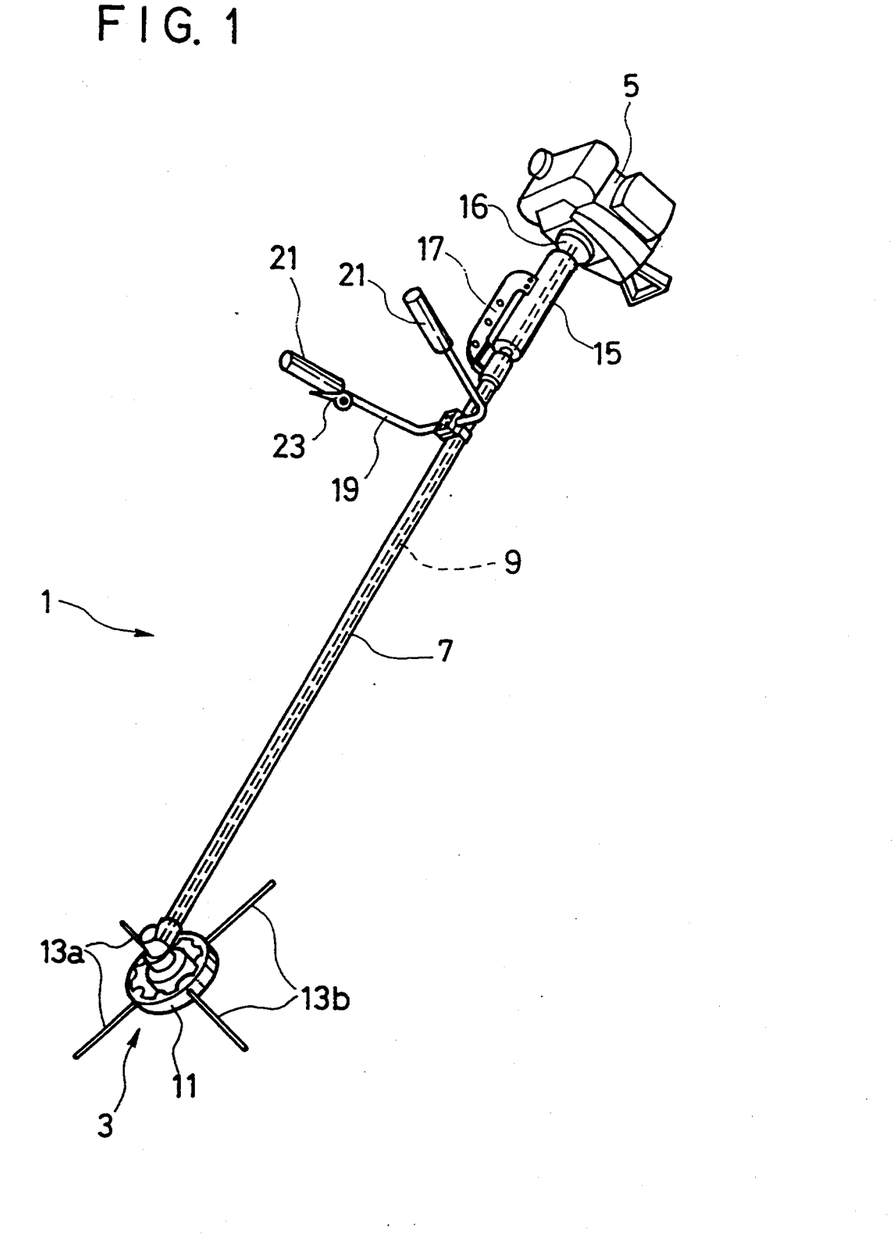
FIG. 1 is a perspective view showing an embodiment of the mowing apparatus according to the present invention.

FIG. 1 shows a general aspect of the mowing apparatus according to the present invention. The mowing apparatus 1 comprises a mowing head 3, a gas powered motor 5 which is a power source for operating the mowing head 3, and a tubular connecting pipe 7 which connects the mowing head 3 and the motor 5. The rotational driving power of the motor 5 is transmitted to the mowing head 3 by a transmission shaft 9 which passes through the inner bore of the connecting pipe 7.

The mowing head 3 has a disk-like or circular rotational member 11 and two cutting lines 13a and 13b which are secured to the rotational member 11 so that both terminal ends of each of the cutting lines 13a and 13b are freely extend from the rotational member 11. The rotational member 11 is rotatably supported on the mowing head 3 and is rotated with the cutting lines 13a and 13b relative to the mowing head 3 by the driving power supplied from the motor 5.

The rear end portion of the connecting pipe 7 is covered with a shock absorber 15 and is fixed to a clutch housing 16 which is located at the front end of the motor 5. In front of the shock absorber 15, a support rod 17 is rotatably fitted to the connecting pipe 7 and it is used for connecting a shoulder band (not shown) to the connecting pipe 7. Moreover, a U-shaped handle 19 with a pair of grip portions 21 provided on the opposite ends thereof is fixedly fitted to the connecting pipe 7 to allow the operator to move the mowing head 3 easily. Near the grip portions 21, a throttle lever 23 is arranged and connected to the motor 5 for operating the motor to regulate the rotation speed of the rotational member 11.

To utilize the mowing apparatus, the mowing apparatus 1 is hung from the shoulder of the operator by using a shoulder band and the motor 5 is started. The rotational member 11 and the cutting lines 13a and 13b are then rotated at a high speed and the rotating lines 13a and 13b cut the grass around the mowing head. The operator moves the mowing head 3 with the handle 19 to a desired place to mow.

The details of the rotational member 11 are shown in FIGS. 2 to 5. The rotational member 11 has a peripheral portion 25 and a central portion 27. The peripheral portion 25 includes an outer peripheral portion 25a which extends horizontally at the bottom of the rotational member 11 and an inner annular peripheral portion 25b which is slightly raised from the outer peripheral portion 25a and extends horizontally. The central portion 27 is steeply raised from the inner peripheral portion 25b and extends horizontally at the top side of the rotational member 11. In addition, the mowing head has a bearing body 29 which rotatably supports a rotation shaft 31. The rotation shaft 31 is linked with the transmission shaft 9 via a gearing mechanism, etc. (not shown) so that the rotation shaft 31 is rotated by the motor 5. The lower end of the rotation shaft 31 extending vertically from the bearing body 29 is provided with a screwed bolt portion 33. The bolt portion 33 is inserted into a fitting hole 35 which is formed at the center of the central portion 27 of the rotational member 11, and the central portion 27 is fixed to the rotation shaft 31 with a washer 37 and a nut 39, so that the rotational member can be rotated with the rotation shaft 31 relative to the bearing body 29.

The rotational member 11 has retention means for retaining the cutting lines 13a and 13b on the rotational member 11 at the peripheral portion 25.

In detail, four peripheral walls 41, having an arc shape, surround the peripheral portion 25 at equal intervals and extend perpendicularly from the peripheral portion 25 and coaxially with the rotation shaft 31.

Each of the peripheral walls 41 has a pair of opposing identical members, i.e. guide walls 43, each of which is integral with the peripheral wall 41 and is smoothly bent from the peripheral wall 41 to the central side of the rotational member 11 to extends in an approximately radial direction. Between every two neighboring peripheral walls 41, two guide walls 43 of the neighboring peripheral walls 41 face each other so as to form a first passage 45, between the guide walls 43, which extends radially with a predetermined radial length. As a result, each of the first passages is communicated to the outside of the rotational member 11 while it is gradually enlarged, and communicates with the inside along a radial direction. The tip of each of the guide walls 43 is formed Into a round shape. Moreover, the top side of the first passage 45 is half covered with an upper wall 47 at the circumference of the rotational member 11. The upper wall 47 has a vertical bend 49 which narrows the first passage 45.

Moreover, In each of the peripheral walls 41, the lower portion of the inner side surface thereof has a pair of wide circumferential nails 51. Each of the nails 51 is formed into an arc shape along the peripheral wall 41 and has an inner side face 53 which is extended from the bottom to almost the mid-level of the height of the rotational member 11 while being inclined radially inwards, i.e. inclined to the center of the rotational member 11, at an inclination of about 20° from a right angle so that the inner side face 53 lies on a conical surface. Corresponding to each of the nails 51, a wide hook 55 of an arc shape stands on the peripheral portion 25 of the rotational member 11, facing the nail 51 with a space 57 therebetween and extending coaxially with the nails 51 and the rotational member 11. Each of the hooks 55 includes a leg 55a and a bend 55b. The leg 55a is inclined radially outwards with an outer side face 59 inclined outwards symmetrically to the inner face 53 of the corresponding nail 51, and it extends higher than the top of the nail 51. The bend 55b with its bottom face extend radially outwards, or, in parallel to the bottom surface of the rotational member, from the top of the leg 55a over the space 57 between the leg 55a and the corresponding nail 51. However, the tip end of the bend 55b is apart from the corresponding peripheral wall 41 so that the space 57 is opened to the outside. As a result of the above-described structure, the space 57 between the leg 55a and the nail 51 is tapered and then communicated with the outside above the rotational member 11 through a twice-bent space 61.

Figure 5:
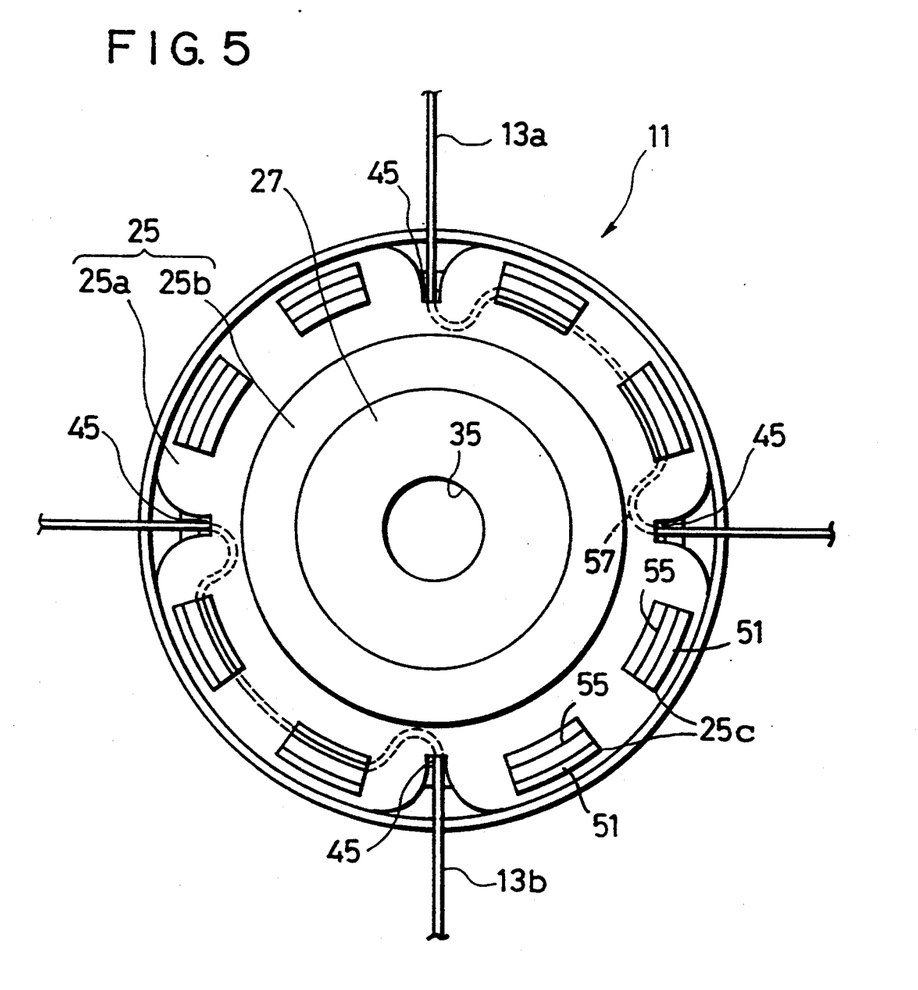
FIG. 5 is a plan view from the bottom side of the rotational member of FIG. 2.

The outer peripheral portion 25a has openings 25c each of which is formed below each pair of the nail 51 and the hook 55 as shown in FIG. 5.

According to the above-described construction, the work of setting the cutting lines 13a, 13b to the rotational member 11 is performed as follows.

First, the intermediate portion of the cutting line 13a is placed above and inserted into a pair of twice-bent spaces 61 which are located at the side of one peripheral wall 41. Next, the Inserted portion of the cutting line 13a is slightly shifted toward the center of the rotational member 11, so that the inserted portion reaches the tapered spaces 57. Then, the inserted portion is further pushed down into the tapered spaces 57. Namely, the direction in which the cutting line is moved before it is received in the tapered space 57 is changed twice. Then, the length of both ends of the cutting line 13a extending from said pair of tapered spaces 57 are made uniform by sliding the cutting line 13a In one direction or the other, before the ends of the cutting line 13a are inserted into and passed through the first passages 45 which are neighboring said pair of spaces 57. As a result, the cutting line 13a is smoothly curved and guided from the space 57 by the guide wall 43 which has a round tip, and setting of the cutting line 13a is completed, thereafter it is introduced to the outside through the first passages 45. Similarly, the other cutting line 13b can be set by the above setting operation.

As a result of the line setting as described above, each of the cutting lines 13a, 13b is arranged on the rotational member 11 so as to be introduced along said two first passages 45 and a second passage which has a multiple of curves between said two first passages 45. In more detail, the second passage includes the arc-shaped space 57 and the second passage is twice curved in S-shapes In the location between the arc-shaped space 57 and said two first passages 45. By this multiple curved structure, it becomes rather difficult to move the cutting line set on the rotational member by pulling one end of the cutting line. This is because, at each of the curved places, the cutting line is pushed against the side wall located at the inside of the curve, and frictional force is produced on that side wall, thereby resisting the pulling force. Namely, the multiple curved structure to prevents shifting of the set cutting line during mowing, in the second passage. Moreover, the second passage is not sharply angular but always smoothly curved. Therefore, it is possible to prevent the failure of lines due to a concentrated stress by distributing local stresses over the smooth curves.

In the multiple curving structure, the curvature in the S-shaped pass depends on the positional difference in the radial direction between the round top of the guide wall 43 and the outer side face 59 of the hook 55. Excessively sharp curvature is not preferable for durability of the cutting lines so more gradual curves are desirably utilized. Therefore, the tip of the guide wall 43 locates on a position which is a little nearer to the center of the rotational member 11 in a radial direction than the outer side face 59 of the hook 55. Moreover, in the above-described curving structure, the cutting lines are set on the periphery of the rotational member 11. Accordingly, the central portion of the rotational member 11 has enough room to design the structure of the rotational member so as to ensure fitting of the rotational member to the rotation shaft 31. The curvature of the cutting line In the space 57 is also relatively gradual.

According to the above-described arrangement of the retention means, the rotational member 11 is well-balanced due to high symmetricalness of the arrangement.

Moreover, the present invention has important features in the spaces 57 and 61.

First, the space 57 is tapered from the bottom to the upper portion by the inclined faces 53 and 59, and the narrowest top portion of the space 57 has a size which is slightly wider than the thickness of the cutting line 13. This structure has an effect such as to inhibit the cutting line from moving upwards and releasing from the rotational member 11. This effect can be made more certain by provision of the vertical bend 49 which extends from the upper wall 47, because the bend 49 also prevents the cutting line from moving upwards at the first passage 45. Moreover, it is clear that the above effect can be obtained even when the width of the nail in the circumferential direction is made rather narrower than that of the hooks.

Second, the tapered space 57 between the nail 51 and the hook 55 is communicated to the outside via the twice-bent space 61, and this twice-bent space 61 has a size which is slightly wider than the thickness of the cutting lines. This construction also makes it difficult for the cutting line, which is set once into the space 57, to move toward the upper side and release from the rotational member. Namely, the twice-bent space 61 restrains the cutting line from being straight released from the retention means. However, it is, reversely, quite easy to set the cutting lines through the twice-bent space 61 into the space 57. Therefore, it is possible, after the setting operation, to prevent accidental releasing of the cutting lines from the rotational member 11. The above described restraining structure is also aideal by the internal repulsive force of the lines, which act at the curved portions of the cutting lines, to restore the cutting line to the straight state.

During the mowing operation, two kinds of force act on the portions of the cutting lines 13a and 13b which are set into the space 57. One is produced by the centrifugal force and the like which act on the ends of the cutting lines 13a and 13b to radially pull the ends outwards. As a result of this, the cutting lines 13a and 13b in the spaces 57 are forced against the outer side faces 59 of the hooks 55. The other force is produced by the centrifugal force which acts on the portions of the cutting lines in the space 57 and force them in the radially outward directions toward the inner side face 53 of the nail 51. If the cutting lines are fresh and long, the force directed radially inwards to the faces 59 is quite large. If the cutting lines become short or light by wearing out, the force directed to the faces 59 becomes small so that the cutting lines are forced to the faces 53. In either case, the above-described first feature of the space 57 works effectively to restrain the cutting line from the rotational member.

In connection with the above, the above-described second feature about the space 57 is advantageous in that the twice-bent space 61 is first bent In the radially outward direction, namely, opposing to the direction of the force which is applied to the cutting lines in the space 57 during the ordinary mowing operation. In accordance with this, assurance of retention and prevention of release of the cutting lines can be increased. In the light of the above, it is also possible to modify and simplify the twice-bent space 61 to bend radially only once, with inclined toward the upper side, before communicating to the outside.

In the above embodiment, it can be clearly understood that the widths of the space 61 and the narrowest top portion of the space 57 can be changed within a range of not less than the thickness of the used cutting line so that the cutting line can be easily inserted into the space 57 through the space 61.

Moreover, two pairs of nails 51 and hooks 55 are provided between the neighboring two first passages 45, in the above embodiment. However, it is of course possible to combine or further separate said two pairs of nails and hooks to provide only one pair or more than two pairs of nails and hooks.

Furthermore, four ends of two cutting lines 13a and 13b in the above embodiment are located at uniform angular intervals. However, it is also possible to change the intervals as the necessity arises.

In the above embodiment, four pairs of nails 51 and hooks 55 are present. However, only two pairs of nails 51 and hooks 55 are used to retain the cutting lines, these being positioned approximately 180° apart on the rotational member 11. Therefore, it is possible to omit the two unused pairs of nails and hooks located on two diagonally facing quarter portions of the rotational member 11.

Figure 2:
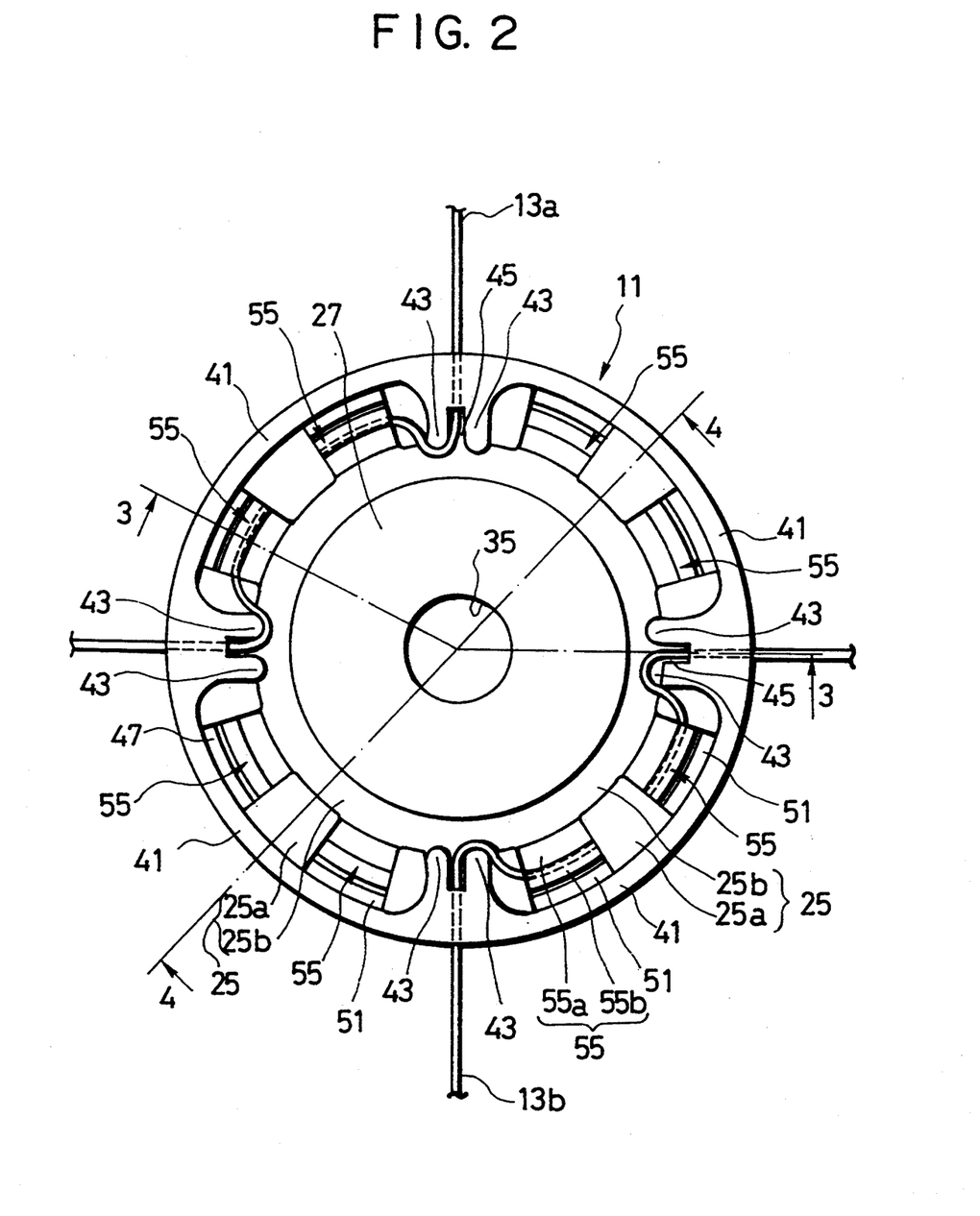
FIG. 2 is a horizontal cross-sectional view of the rotational member of the mowing apparatus shown in FIG. 1.
Figure 3:
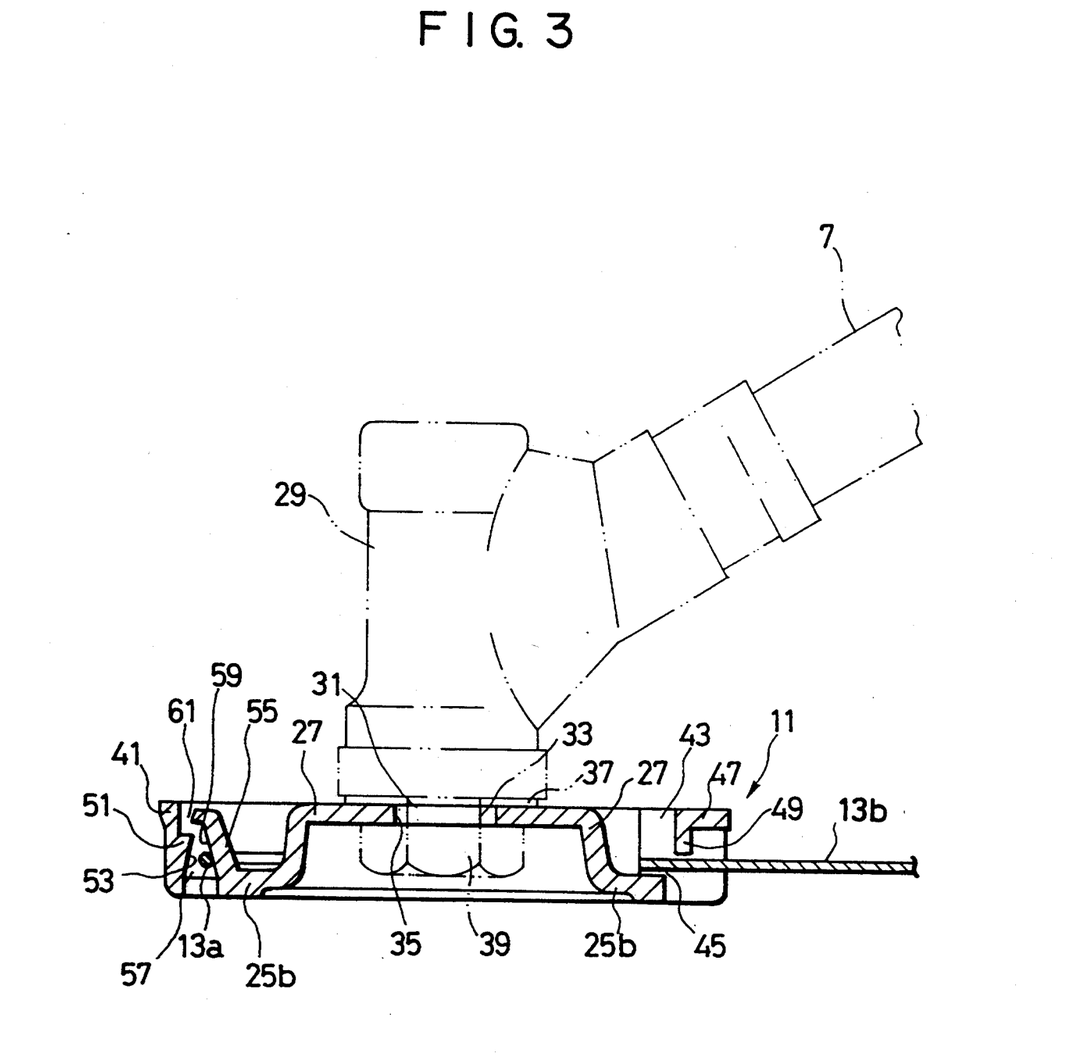
FIG. 3 is a vertical cross-sectional view of the rotational member taken along a line 3—3 of FIG. 2.
Figure 4:
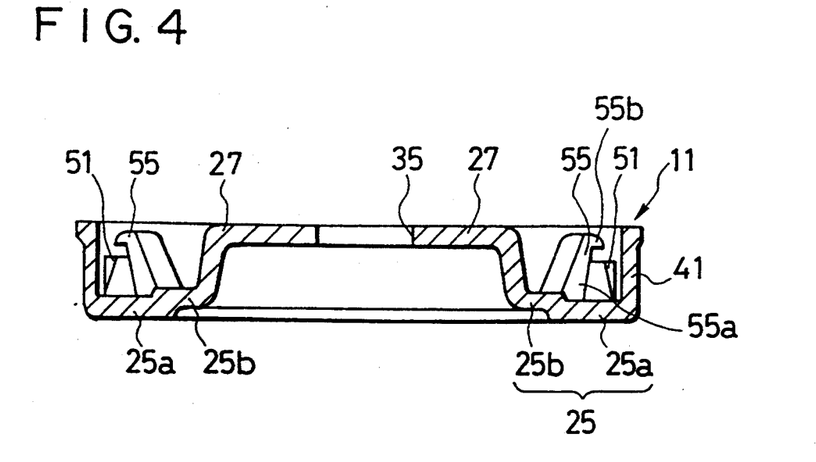
FIG. 4 is a cross-sectional view of the rotational member taken along a line 4—4 of FIG. 2.

Since the above embodiment is designed for incorporating two cutting lines so that four terminal ends of the two cutting lines are symmetrically located at angular intervals of 90° around the rotational member 11, the retention means comprises four equal portions, as clearly understood from FIG. 2. However, it is of course possible, if three cutting lines are used, to change the retention means so as to comprise six equal portions.

It can be also clearly understood, a rotational member having a flat bottom without any raised portion can be used for the present Invention. However, the raised central portion of the rotational member is reasonable for fitting of the rotational member with a nut to the rotational shaft.

For the motive power source, an electrical motor or a hydraulic pressure motor can be employed as the occasion arises in stead of the gas powered motor.

Moreover, the mowing apparatus of the present Invention may comprise means for interrupting transmission of the rotational motion from the power source to the rotation shaft when the rotational motions of the rotational member and the rotation shaft are suddenly restricted, e.g. stopped by winding the cutting line on a rigid substance which produces an excessive torque. For example, it is possible to utilize a friction clutch mechanism and the like.

This invention can be embodied In portable type mowers, vehicular type or push type lawn mowers. Furthermore, the apparatus of this invention can also be used as an attachment for a construction machine or an industrial machine.

It must be understood that the invention is in no way limited to the above embodiments and that many changes may be brought about therein without departing from the scope of the invention as defined by the appended claims.

What is claimed is:

1. A mowing apparatus comprising:
   a motive power source for supplying rotational motion;
   a circular rotational member which is adapted for rotation by the rotational motion supplied by the motive power source;
   at least one flexible cutting line having opposite ends, the each cutting line being adapted to set on the rotational member in such a manner that the opposite ends of the cutting line freely extend from the rotational member to the outside and rotate with the rotational member, thereby mowing with the ends of the cutting line;
   retention means provided on the rotational member for removably retaining the cutting line on the rotational member, the retention means comprising at least a pair of a first face and a second face, each of which stands on the rotational member and faces toward each other with a space therebetween in which the cutting line is to be received for retention so that the cutting line passes between the first and second faces;
   wherein the retention means further comprises means for restraining the cutting line from being released from the space between the first and second faces, said restraining means comprising inclinations provided on each of the first and second faces so that each of the first and second faces is inclined toward each other to provide a gradually narrowing space between the first and second faces.

2. The mowing apparatus as set forth in claim 1, wherein the inclinations of each of the first and second faces is approximately 20°, and the space is narrowed to a width which is wider than the thickness of the cutting line.

3. The mowing apparatus as set forth in claim 1, wherein each of the first and second faces is curved to extend in a circumferential direction coaxially with the rotational member, respectively.

4. The mowing apparatus as set forth in claim 1, wherein the first face stands higher than the second face.

5. The mowing apparatus as set forth in claim 4, wherein the restraining means further comprises a bend face which extends from the first face over the space between the first and second faces, so that the space between the first and second faces is connected with a bent space.

6. The mowing apparatus as set forth in claim 5, wherein the bend face extends in parallel to the rotational member.

7. The mowing apparatus as set forth in claim 5, wherein the second face is located at the circumferential side of the rotational member.

8. The mowing apparatus as set forth in claim 1, wherein the retention means further comprises a peripheral wall which extends along the circumference of the rotational member, and the restraining means comprises a hook which is provided in the vicinity of the peripheral wall, in which the first face is formed on the hook, and the second face is provided on the peripheral wall.

9. The mowing apparatus as set forth in claim 1, wherein the retention means further comprises guide means for guiding the cutting line In a radial direction on the rotational member.

10. The mowing apparatus as set forth in claim 1, wherein the number of the cutting line is two, the number of said pair of the first and second faces is at least two, the retention means further comprises four peripheral walls and eight guide walls, each of which extends from each of the opposite ends of the peripheral walls toward the center of the rotational member so that two guide walls located between two neighboring peripheral walls face each other, and each of the guide walls has an end which is formed round.

11. A mowing apparatus comprising:
a motive power source for supplying rotational motion;
a circular rotational member which is adapted for rotation by the rotational motion supplied by the motive power source;
at least one flexible cutting line having opposite ends, the cutting line being adapted to set on the rotational member in such a manner that the opposite ends of the cutting line freely extend from the rotational member to the outside and rotate with the rotational member, thereby mowing with the ends of the cutting line;
retention means provided on the rotational member for removably retaining the cutting line on the rotational member, the retention means comprising at least a pair of a first face and a second face, each of which stands on the rotational member and faces toward each other with a space therebetween in which the cutting line is to be received for retention so that the cutting line passes between the first and second faces; and
restraining means for restraining the cutting line from being released from the space between the first and second faces;
wherein the first face stands higher than the second face, and the restraining means comprises a bend face extending from the first face over the space between the first and second faces.

12. The mowing apparatus as set forth in claim 11, wherein the retention means further comprises guide means for guiding the cutting line in a radial direction on the rotational member.

13. The mowing apparatus as set forth in claim 12, wherein the cutting line is set in such a manner that the cutting line is radially guided and passed between the first and second faces and that the cutting line lies in a S-shape between the guide means and said pair of first and second faces.

14. The mowing apparatus as set forth in claim 13, wherein each of the first and second faces is inclined toward each other to provide a gradually narrowing space between the first and second faces, wherein said space is narrowed to a width which is wider than the thickness of the cutting line.

15. The mowing apparatus as set forth in claim 11, wherein each of the first and second faces is curved to extend in a circumferential direction coaxially with the rotational member, respectively.

16. The mowing apparatus as set forth in claim 15, wherein the second face is located at the circumferential side of the rotational member.

17. The mowing apparatus as set forth in claim 11, wherein the bend face extends in parallel to the rotational member.

18. The mowing apparatus as set forth in claim 11, wherein the retention means further comprises a peripheral wall which extends along the circumference of the rotational member, and the second face is provided on the peripheral wall.

19. The mowing apparatus as set forth in claim 11, wherein the number of the cutting lines is two, the number of said pair of the first and second faces is at least two, the retention means further comprises four peripheral walls and eight guide walls, each of which extends from each of the opposite ends of the peripheral walls toward the center of the rotational member so that two guide walls located between two neighboring peripheral walls face each other, and each of the guide walls has an end which is formed round.

20. A mowing apparatus comprising:
a motive power source for supplying rotational motion;
a circular rotational member which is adapted for rotation by the rotational motion supplied by the motive power source;
at least one flexible cutting line having opposite ends, the cutting line being adapted to set on the rotational member in such a manner that the opposite ends of the cutting line freely extends from the rotational member to the outside and rotates with the rotational member, thereby mowing with the ends of the cutting line;
retention means provided on the rotational member for removably retaining the cutting line on the rotational member, the retention means comprising at least a couple of a nail and a hook facing toward each other, the nail being provided at a circumferential position of the rotational member, the hook standing higher than the nail and locating on a radially inward position on the rotational member, and the cutting line being to be received for retention so that the cutting line passes between the hook and the nail.

* * * * *